United States Patent [19]

DuLac et al.

[11] Patent Number: 4,843,544
[45] Date of Patent: Jun. 27, 1989

[54] METHOD AND APPARATUS FOR CONTROLLING DATA TRANSFERS THROUGH MULTIPLE BUFFERS

[75] Inventors: Keith B. DuLac, Derby; Bret S. Weber, Wichita, both of Kans.

[73] Assignee: NCR Corporation, Dayton, Ohio

[21] Appl. No.: 101,354

[22] Filed: Sep. 25, 1987

[51] Int. Cl.⁴ .............................................. G06F 13/00
[52] U.S. Cl. ................................................... 364/200
[58] Field of Search ... 364/200 MS File, 900 MS File

[56] References Cited

U.S. PATENT DOCUMENTS

| | | | |
|---|---|---|---|
| 3,673,576 | 6/1972 | Donaldson | 364/200 |
| 4,183,084 | 1/1980 | Lawson | 364/200 |
| 4,215,400 | 7/1980 | Denko | 364/200 |
| 4,349,875 | 9/1982 | Tada | 364/200 |
| 4,428,064 | 1/1984 | Hempy et al. | 364/900 |
| 4,467,411 | 8/1984 | Fry et al. | 364/200 |
| 4,612,613 | 9/1986 | Gershenson | 364/200 |
| 4,651,277 | 3/1987 | Sakaji | 364/200 |
| 4,667,286 | 5/1987 | Young et al. | 364/200 |

Primary Examiner—David Y. Eng
Attorney, Agent, or Firm—Wilbert Hawk, Jr.; Edward Dugas; Jack R. Penrod

[57] ABSTRACT

A method of operating a finite state machine to control the sequence of operations for transferring data through two or more rotating data buffers. The data transfer is either from a SCSI bus to a disk memory system, or from a disk memory system to a SCSI bus. The finite state machine is self-sequencing after initiation from an external source. An apparatus for implementing the method is also presented.

8 Claims, 8 Drawing Sheets

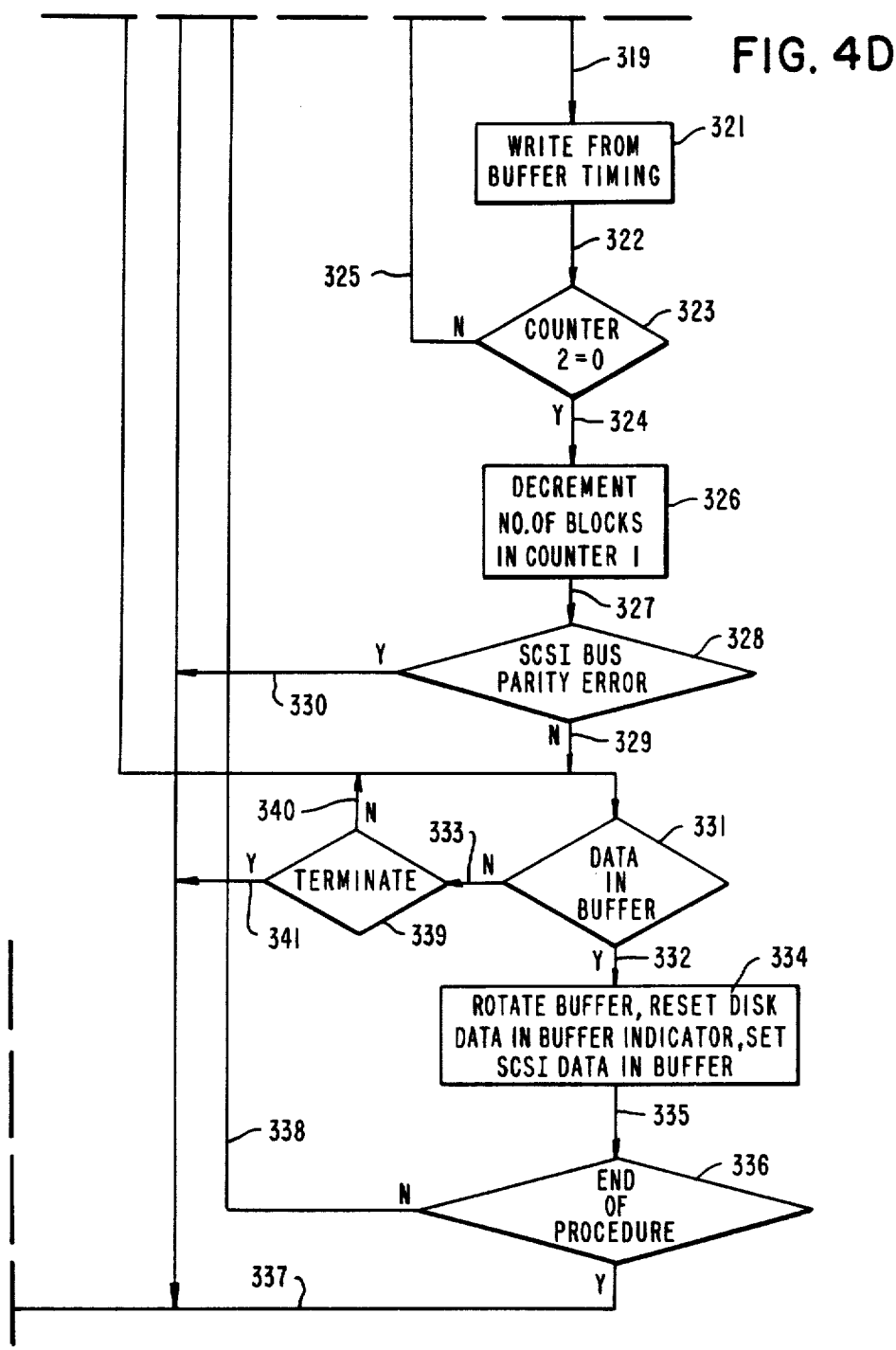

METHOD AND APPARATUS FOR CONTROLLING DATA TRANSFERS THROUGH MULTIPLE BUFFERS

CROSS REFERENCE

This patent application is related to copending U.S. application Ser. No. 100,699 filed Sept. 24, 1987 entitled Integrated Multiple Buffer Controller by Keith Du Lac and Bret S. Weber and assigned to the same assignee as the present invention.

BACKGROUND

This invention concerns electronic data processing systems, and more particularly a method and apparatus for controlling the transfer of data between a SCSI bus of an electronic data processing system and a peripheral storage device.

The problem of transferring data from a peripheral storage media such as: punched cards, punched tape, magnetic tape, magnetic drums, magnetic disks, and optical disks has always been a major consideration as the technology of automatic data processing systems advanced. Peripheral storage media were required to increase in data handling rate, decrease in data storage density, and improve the cost per unit increase of the data storage density with respect to the data handling performance in order to remain attractive in the marketplace. These three aspects of the peripheral storage system had to not only improve together, but also had to keep pace with the rapid improvements in the related technology of automatic data processing systems.

With the completion of the ANSI X3.131-1986 standard for a small computer system interface (SCSI), the small computer industry set the goals for the next generation of small system peripheral interfaces and the interaction of peripheral storage media with such interfaces. The SCSI standard paves the way for a very high data transfer rate between the SCSI bus and a peripheral storage device, such as a Winchester disk system. To achieve these higher rates, a high speed method and apparatus for data transfer is needed, which does not exist in the electronic data processing field.

U.S. Pat. No. 4,612,613 issued Sept. 16, 1986, discloses a FIFO buffer queue (607) in FIG. 6 which is part of a disk drive control apparatus. This FIFO buffer transfers both control information and data between the disk memories (119n-119o) and the controller (107 See FIG. 1). The FIFO buffer 607 is a single buffer which is sixteen bits wide by 10 words deep (See Column 40, Line 48 et seq.), which is controlled by an apparatus controller 609 (Column 40, Line 42 et seq.) to sort out the destinations of each entry stored in the FIFO buffer 607. The operation of FIFO buffer 607 is detailed at Column 13, Line 21 through Column 14, Line 27. Since the control information and data information are interleaved in this single FIFO buffer, the apparatus control 609 had to be rather complex in order to select and transfer the information to its proper destination. Such a complex buffer control method either slows things down, or leads to very high speed and very high cost control circuitry.

U.S. Pat. No. 3,673,576 issued June 27, 1972, discloses a programmable computer peripheral interface. The interface performs the function of a direct memory access controller which either receives data from the computer main memory or transmits data to the computer main memory during an interrupt condition of the central processing unit. This peripheral interface would only transfer blocks of individual words either to or from the peripheral device and perform any word length changes such as from sixteen to thirty-two bits words required in the process. Such a method and apparatus would be far too slow to transfer multiple blocks of sectors of bytes such as transferred between a SCSI bus and a Winchester hard disk device.

U.S. Pat. Nos. 4,467,411 issued Aug. 21, 1984 and 4,428,064 issued Jan. 24, 1984, which are both commonly assigned to IBM, disclose various control aspects for a managed buffer of a magnetic tape storage device. These two patents disclose devices which control data buffers according to a most-recently-used/least-recently-used (MRU/LRU) algorithm. This algorithm stores and retains large amounts of data that is related to the last data requested because statistical studies have shown that the next word of information requested by a central processing unit has a very good probability of being closely related to the previous word of information requested. Such probabilities are used as speed up techniques to compensate for the slower data rate of the magnetic tape drive. Such complex buffer management through prioritizing the data according to MRU/LRU considerations are obviated by the data availability of hard disk drives, thus, opening the way for simpler and faster methods of operating data transfer buffers.

Another patent of interest is U.S. Pat. No. 4,349,875 issued Sept. 14, 1982, which discloses a buffer storage control apparatus which uses a variation of the least-recently-used algorithm discussed previously to the control of the data transfers to or from its buffers. This variation of the LRU algorithm, like the MRU/LRU algorithm, is unnecessary when a high speed storage device is used since the LRU algorithm is used to compensate for slower data storage devices.

It is an object of this invention to provide a method for controlling the transfer of information between a SCSI bus and a high speed data storage device.

It is a further object of this invention to provide a method for controlling data transfers to the SCSI bus from one buffer, while another buffer is available to receive data from the high speed storage device at the same time to attain a high data transfer rate.

It is a further object of this invention to provide a method for controlling data transfers from the SCSI bus to one buffer, while another buffer is available to send data to the high speed storage device at the same time to attain a high data transfer rate.

It is a further object of this invention to provide a finite state machine apparatus for controlling high speed data transfers with the multiple buffers.

SUMMARY OF THE INVENTION

Briefly stated, in accordance with one aspect of the invention, the foregoing objects are achieved by providing a method for controlling the transfer of data between a SCSI bus and a disk memory using a plurality of data buffers including the steps of: (a) initializing the finite state machine to a pause state indicating there is no data to be transferred during the next time segment; (b) determining if an input command to send data to the SCSI bus has occurred and if it has not then skipping to step o; (c) resetting the finite state machine from the pause state indicating that the data transfer is occurring and starting the data transfer; (d) determining if a disk data in buffer input command has occurred and if it has not, then advancing to step n; (e) transferring from the SCSI bus to a first counter the number of blocks of data to be transferred, and to a second counter the number of bytes in each block of data to be transferred to a first buffer of the plurality of data buffers; (f) decrementing the SCSI byte count in the second counter by one; (g) determining if a subsystem error has occurred on the SCSI bus, and if a subsystem error has occurred, returning to step a; (h) determining if a SCSI bus request has occurred, and if a SCSI bus request has not occurred returning to step g; (i) writing a byte of data from the SCSI bus to the first buffer; (j) determining if the number of bytes remaining to be transferred in the block of data is equal to zero, and if the number of bytes of the block remaining to be transferred is not equal to zero, returning to step f; (k) decrementing the block count in the first counter; (l) determining if disk data available for transfer awaits in the buffer and if not so, advancing to step o; (m) rotating to a second buffer of the plurality of buffers, indicating that the second buffer does not have disk data available for transfer, and that the first buffer is available to receive disk data; (n) determining if the end of the data transfer procedure has occurred and if so, returning to step a, and if not so returning to step e; and (o) determining if a terminate data transfer with disk memory input indication has occurred and if not so returning to step a.

In another aspect of the invention the method further includes the steps of: (a) initializing the finite state machine to a pause state indicating there is no data to be transferred; (b) determining if an input command to send data to the SCSI bus has occurred and if it has not then advancing to step a; (c) resetting the finite state machine from the pause state indicating that the data transfer is occurring and starting the data transfer; (d) determining if a disk-data-in-buffer input command has occurred and if it has not, then advancing to step n; (e) transferring from the SCSI bus to a first counter the number of blocks of data to be transferred and transferring to a second counter the number of bytes in each block to be transferred to a first of the plurality of data buffers; (f) decrementing the byte count in the second counter by one; (g) determining if a subsystem error has occurred on the SCSI bus, and if the subsystem error has occurred, returning to step a; (h) determining if a SCSI bus request has occurred, and if the SCSI bus request has not occurred returning to step g; (i) writing a byte of data from the SCSI bus to the first data buffer; (j) determining if the number of bytes remaining to be transferred in the block of data is equal to zero, and if the number of bytes in the block remaining to be transferred is not equal to zero returning to step f; (k) decrementing the block count in the first counter; (1) determining if disk data available for transfer awaits in the first data buffer and if not so advancing to step o; (m) rotating to a second data buffer of the plurality of data buffers, indicating that the second data buffer does not have disk data available for transfer and that the first data buffer is available to receive disk data; (n) determining if the end of the data transfer procedure has occurred and if so returning to step a, and if not so returning to step e; (o) determining if a terminate data transfer with disk memory input indication has occurred, and if not so returning to step a; (p) determining if an input command to receive data has occurred, and if it has not then returning to step a; (q) resetting the finite state machine from the pause state indicating the start of and starting the data transfer; (r) transferring to the first counter the number of blocks to be transferred and to the second counter the number of bytes in each block of data to be transferred from one of the plurality of data buffers; (s) determining if the data buffer referred to in step q has data available for transfer from the disk memory and if not so advancing to step bb; (t) rotating to another of the plurality of data buffers, resetting the data available indicator on the data buffer the SCSI bus just rotated from and setting the buffer-available-for-data indicator on the data buffer the SCSI bus just rotated to; (u) decrementing the byte count in the second counter by one; (v) determining if a subsystem error has occurred in the data transfer and if so, returning to step a; (w) determining if a request for the data available in the data buffer the SCSI bus rotated to in step t has been made by the disk memory and if not so, returning to step v; (x) reading to the SCSI bus a byte of data available in the data buffer the SCSI bus rotated to in step t; (y) determining if the SCSI byte count in the second counter is equal to zero; (z) decrementing the block count in the first counter; (aa) determining if the end of the data transfer procedure has occurred and if not so returning to step s, and if so returning to step a; and (bb) determining if a terminate data transfer with disk memory has occurred and if not so returning to step u, and if so, returning to step a.

In yet a further aspect of the invention, an apparatus for carrying out the above described method is provided, including: a device for determining if an input command to send data to the SCSI bus has occurred; a device for determining if an input command to receive data from the SCSI bus has occurred; a device for resetting the finite state machine from the pause state indicating that the send data transfer is occurring; a device for starting the send data transfer; a device for determining if a disk-data-in-buffer input command has occurred; a device for transferring from the SCSI bus to a first counter the number of blocks of data to be transferred in the send data transfer; a device for transferring to a second counter the number of bytes in each block to be transferred in the send data transfer to a first of the plurality of data buffers; a device for decrementing the byte count in the second counter by one; a device for determining if a subsystem error has occurred on the SCSI bus; a device for determining if a SCSI bus request has occurred; a device for writing a byte of data from the SCSI bus to the first data buffer; a device for determining if the number of bytes remaining to be transferred in the block of data of the send transfer is equal to zero; a device for decrementing the block count in the first counter; a device for determining if disk data available for transfer awaits in the first buffer; a device for rotating to a second data buffer of the plurality of data buffers, indicating that the second data buffer does not have disk data available for transfer and that the first data buffer is available to receive disk data; a device for determining if the end of the send data transfer procedure has occurred; and a device for determining if a terminate send data transfer with disk memory input indication has occurred.

BRIEF DESCRIPTION OF THE DRAWINGS

While the specification concludes with claims particularly pointing to and distinctly claiming the subject matter which is regarded as the invention, it is believed that the invention will be better understood from the following description of the preferred embodiment taken in conjunction with the accompanying drawings in which:

FIGS. 4A through 4D when assembled according to the map of FIG. 4, form a logic flow diagram of the method of controlling two rotating buffers.

DETAILED DESCRIPTION OF THE INVENTION

Figure 1A:
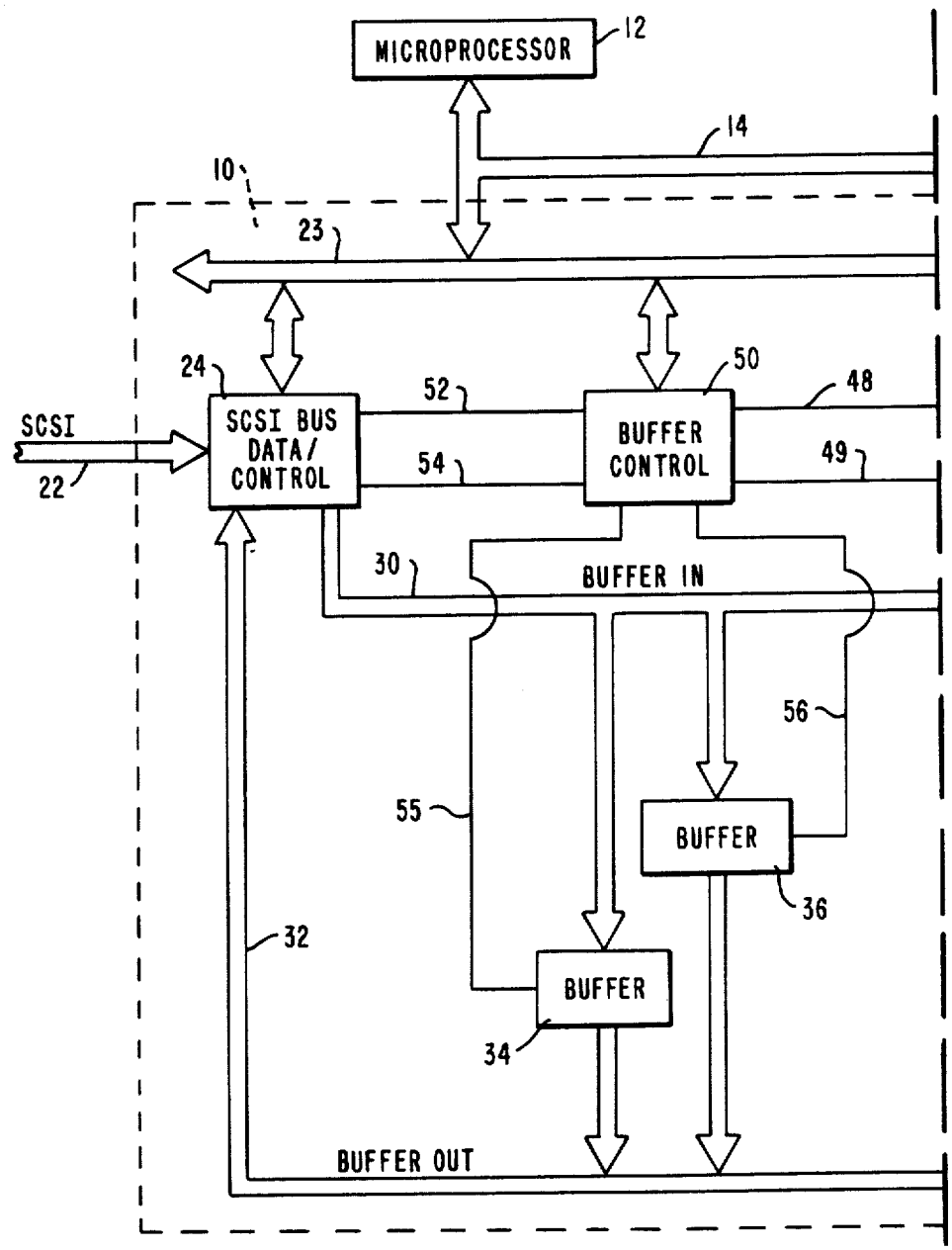
FIGS. 1A and 1B together are a block diagram of a circuit for performing the data transfer method.
Figure 1B:
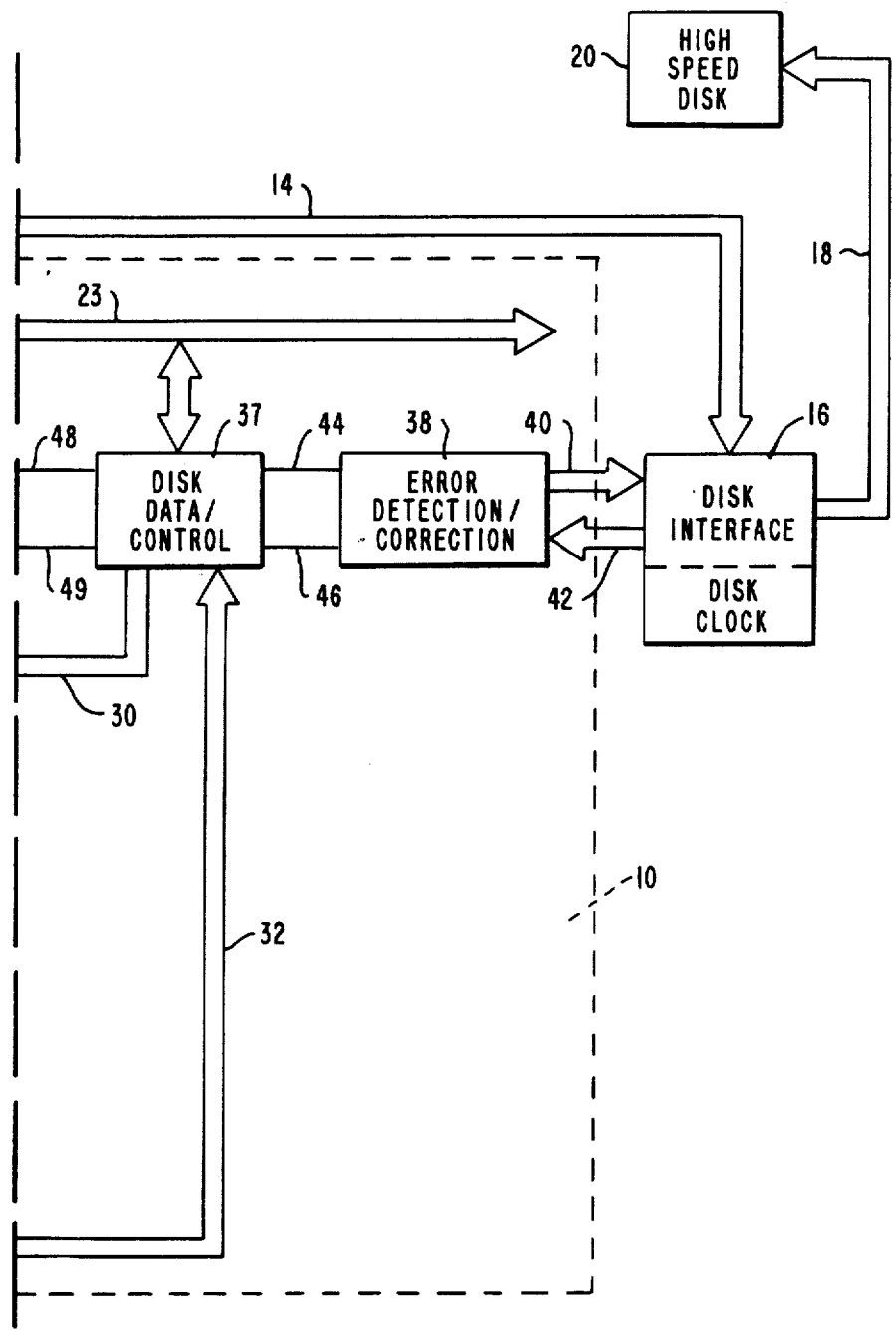

Referring now to FIGS. 1A and 1B, a SCSI Disk Controller integrated circuit (SDC IC) 10 is shown which contains most of the circuitry used in practicing the invention. The SDC IC 10 is connected to a microprocessor 12 by a parallel bus 14. The microprocessor 12 includes a stored program memory for performing, among other things, SCSI protocol arbitration and parity checking, disk drive control, and supervision of SDC IC 10. Part of the supervision of SDC IC 10 is the initializing of the method, which will be explained later. The parallel bus 14 further connects to a disk interface 16. The SDC IC 10 and the microprocessor 12 cooperate to control the disk interface 16 by means of the parallel bus 14.

The disk interface 16 is connected by a control and data bus 18 to a high speed disk 20, such as a Winchester hard disk. The disk 20 stores data in rotating sectors in any format up to the maximum of 521 bytes established by the SCSI standard. The data is either sent to or received from the disk 20 by serial data lines of the bus 18 since the data is stored serially within each sector. The serial lines of bus 18 and the serial data are connected to the disk interface 16, using known techniques. From disk interface 16, the transferred serial data is connected to the SDC IC 10 by an output serial bus 40, and an input serial bus 42.

On the other end of the SDC IC 10 is connected a SCSI bus 22. The SCSI bus 22 sends the data which is ultimately written to the disk 20, and receives the data which is ultimately read from the disk 20. The data may be transferred in either direction by the SCSI bus 22 is in standard, parallel format in blocks containing various groups of data bytes. Each group typically corresponds to an integral multiple of the number of bytes stored in one sector of the disk 20, although other formats for a group are possible with minor variations.

Inside the SDC IC 10, the SCSI bus signals are connected to a SCSI Bus Data/Control circuit 24 which separates the SCSI bus signals into control signals, which are connected to an internal control bus 23; and data signals, which are connected by a Buffer In Bus 30 and a Buffer Out Bus 32 to Buffers 34,36. The Buffer In Bus 30 is only actively carrying data between the SCSI Bus Data/Control circuit 24 and one of the buffers 34,36 during a SCSI send transfer. Similarly, the Buffer Out Bus 32 is only active carrying data between the SCSI Bus Data/Control circuit 24 and one of the buffers 34,36 during a SCSI receive transfer.

The disk interface signals of disk interface 16 are connected by serial buses 40,42 to an Error Detection/Correction circuit 38 inside of the SDC IC 10. Serial bus 42 transfers a serial bit stream to the Error Detecting/Correcting circuit 38 during a disk data send transfer (i.e. a SCSI receive transfer), and serial bus 40 transfers a serial bit stream from the Error Detecting/Correcting circuit 38 during a disk data receive transfer (i.e. a SCSI send transfer). The Error Detection/Correction circuit 38 encodes the data which is sent to the disk interface 16 and subsequently stored on the disk 20 using known cyclic redundancy checking or error correction techniques. Similarly the Error Detection/Correction circuit 38 decodes the data which is retrieved from the disk 20 and received through the Disk Interface 16 using the known inverse techniques in order to keep the data retrieved from the disk 20 error free.

The error free data is transferred between the Error Detection/Correction circuit 38 to a Disk Data/Control circuit 37 across connecting serial buses 44,46. The Disk Data/Control circuit 37 also is connected to the Buffer In Bus 30 and the Buffer Out Bus 32 for the transferring of data. Since buses 30,32 are parallel buses and buses 44,46 are serial buses, the Disk Data/Control circuit 37 is required to perform, among other functions, the conversion of serial data into parallel data, and the conversion of parallel data into serial data, at a high data rate to prevent the Disk Data/Control circuit 37 from being the limiting point of the data throughput capability.

The control information and circuitry of the Disk Data/Control circuit 37 is connected to the internal control bus 23. Additional serial control buses 48,49 connect the Disk Data/Control circuit 37 with a Buffer Control circuit 50. Also, the Buffer Control circuit 50 is connected by serial control buses 52,54 to the SCSI Bus Data/Control circuit 24 and control lines 55,56 to Buffers 34,36 respectively. Moreover, the Buffer Control circuit 50 is connected to the internal control bus 23 in the same manner as the SCSI Bus Data/Control circuit 24 and Disk Data/Control circuit 37 are connected to the internal control bus 23. Thus, the input/output portions of these three control circuits 24,37,50 are commonly connected to the bus 14, the microprocessor 12, and the disk interface 16.

The Buffer Control 50 controls all transfers of data by rotating the Buffers 34,36 such that during a data transfer, one buffer is used for receiving data from the source, whether it be the SCSI Bus 22 or the disk 20, and the other buffer is used for sending data to the destination, whether it be the SCSI Bus 22 or the disk 20. In this manner, assuming that the data block is greater than the capacity of a buffer, one buffer is being supplied by the data source, while the other buffer is emptying data, which was supplied on the previous cycle, to the destination.

Figure 2:
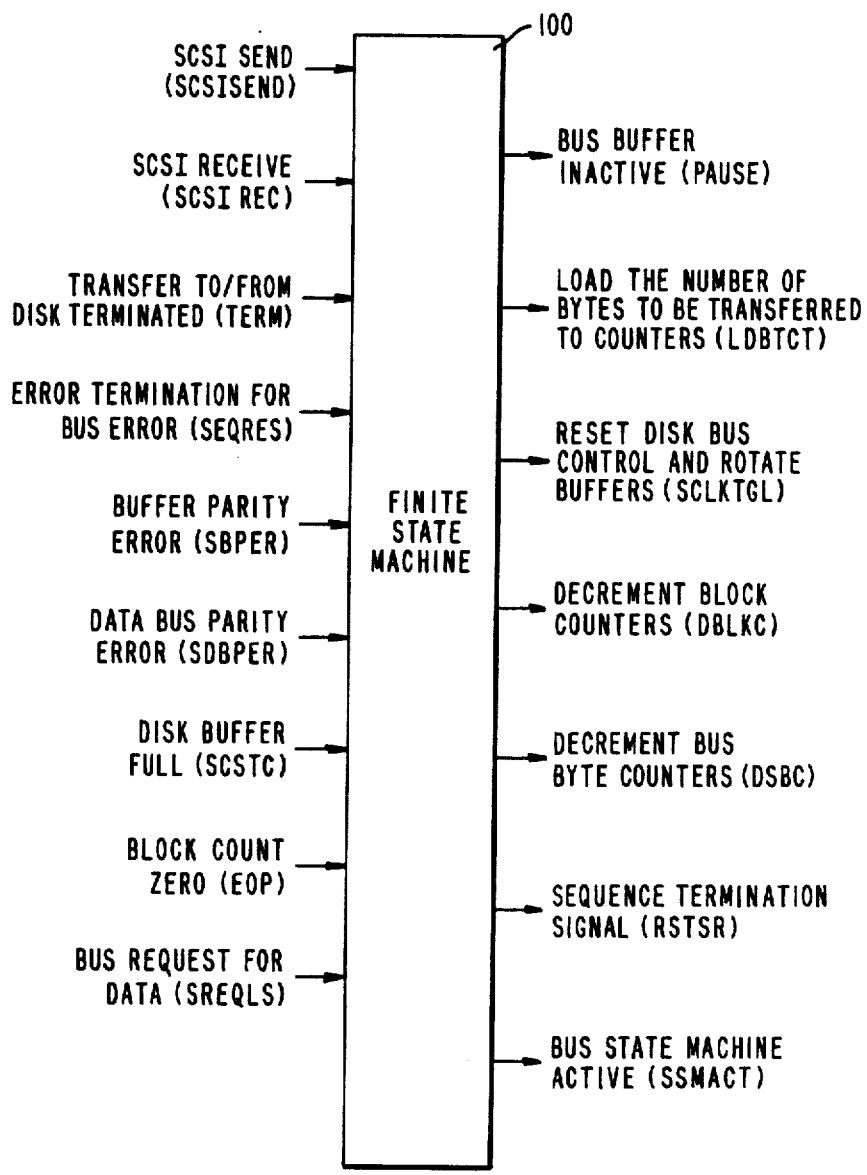
FIG. 2 is a block diagram of a Finite State Machine for performing the data transfer method.
Figure 3:
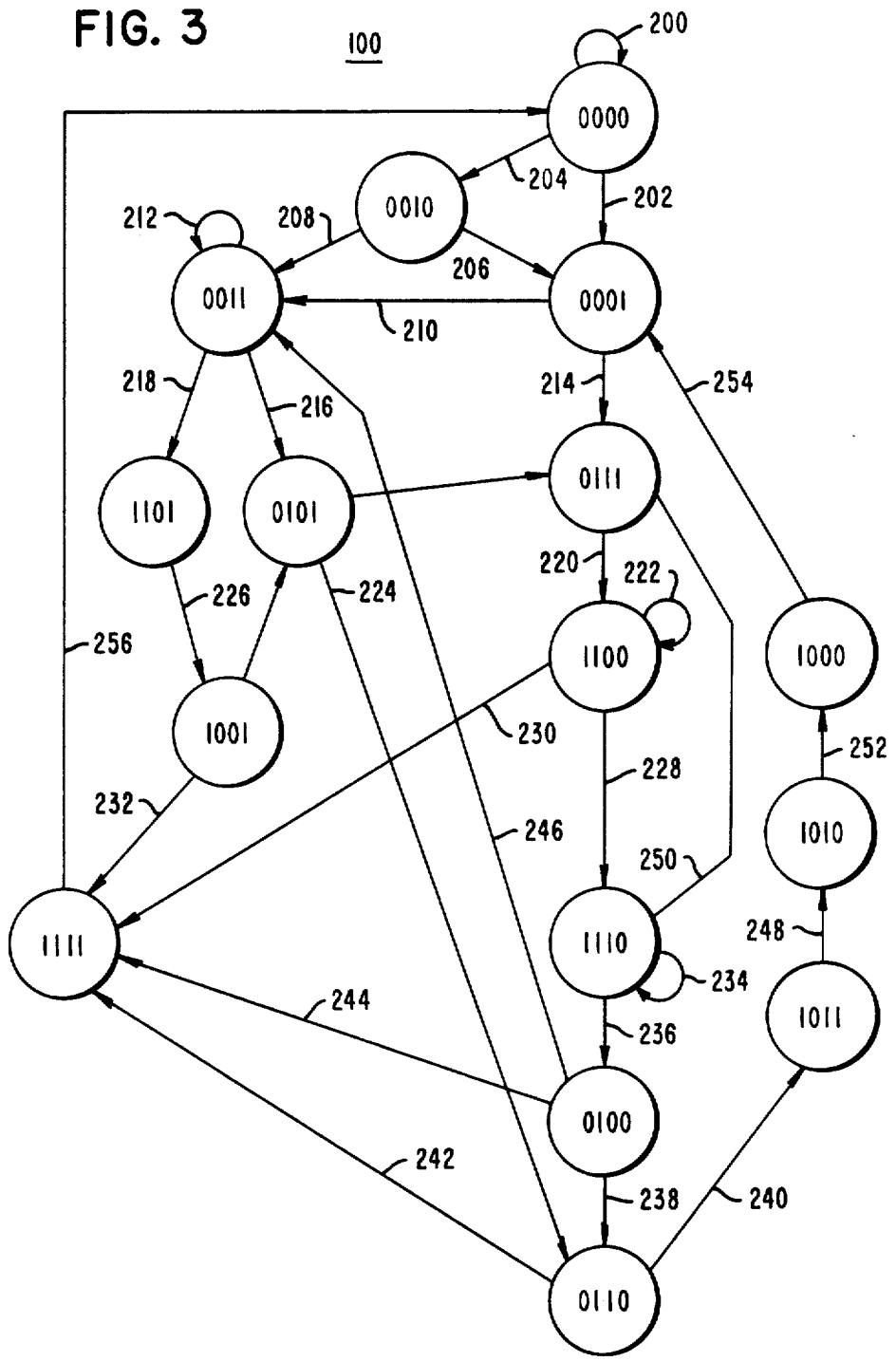
FIG. 3 is a state diagram of a Finite State Machine for controlling the data transfer through two buffers.
Figure 4A:
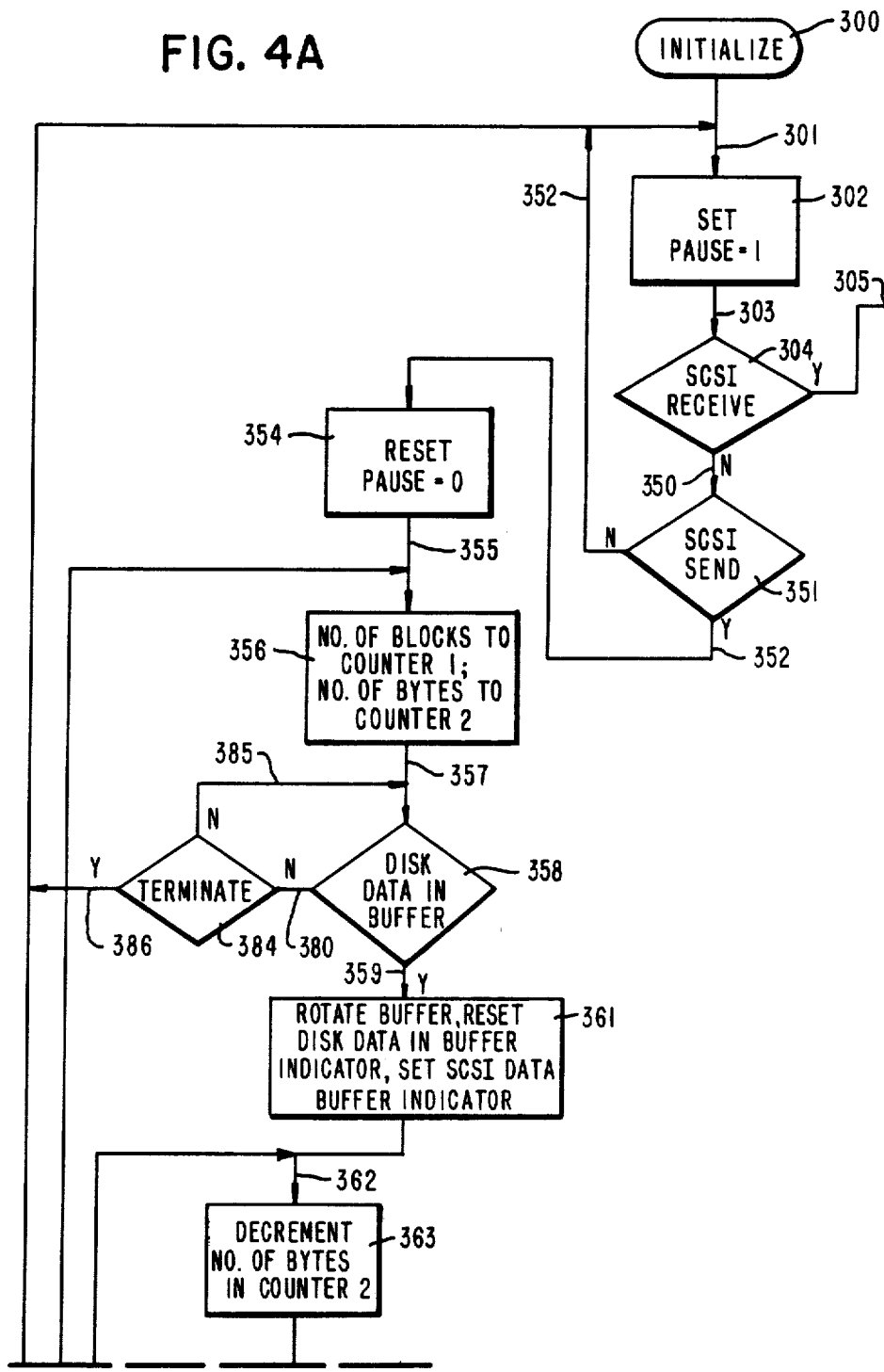
Figure 4B:
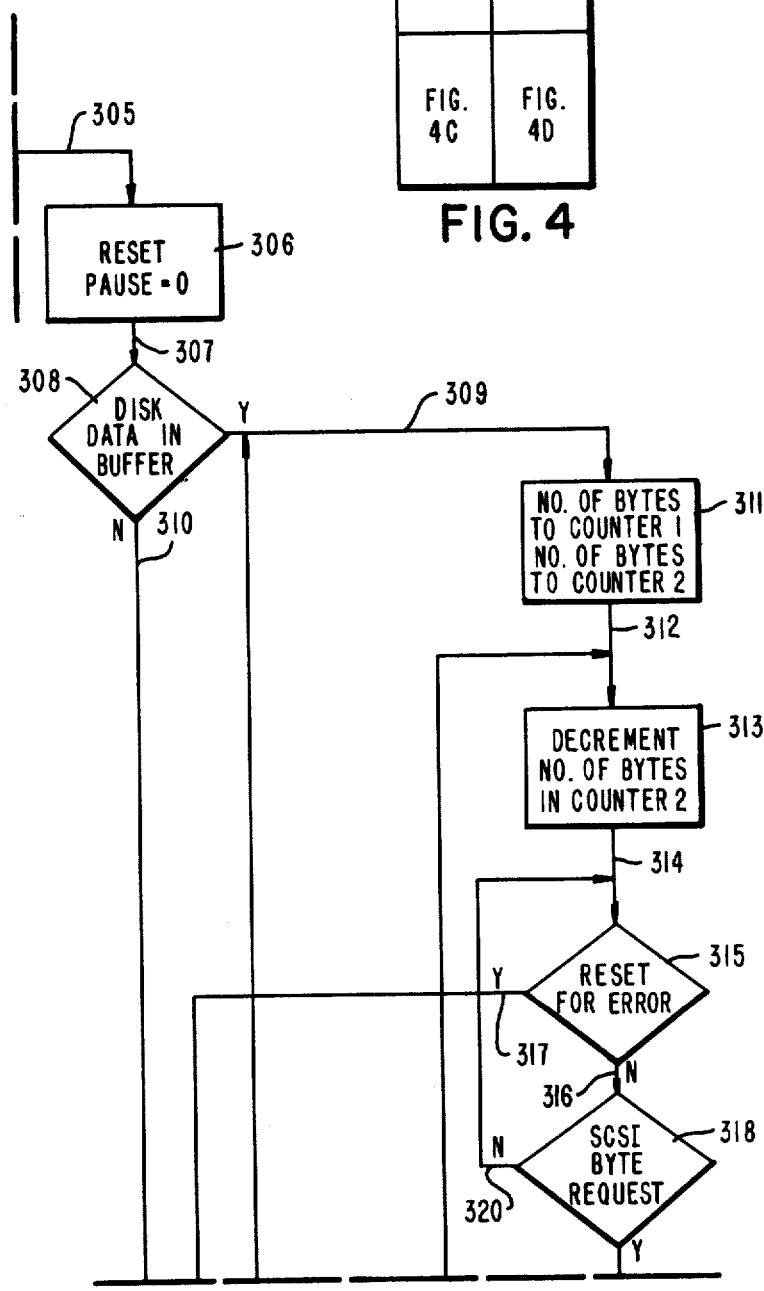
Figure 4C:
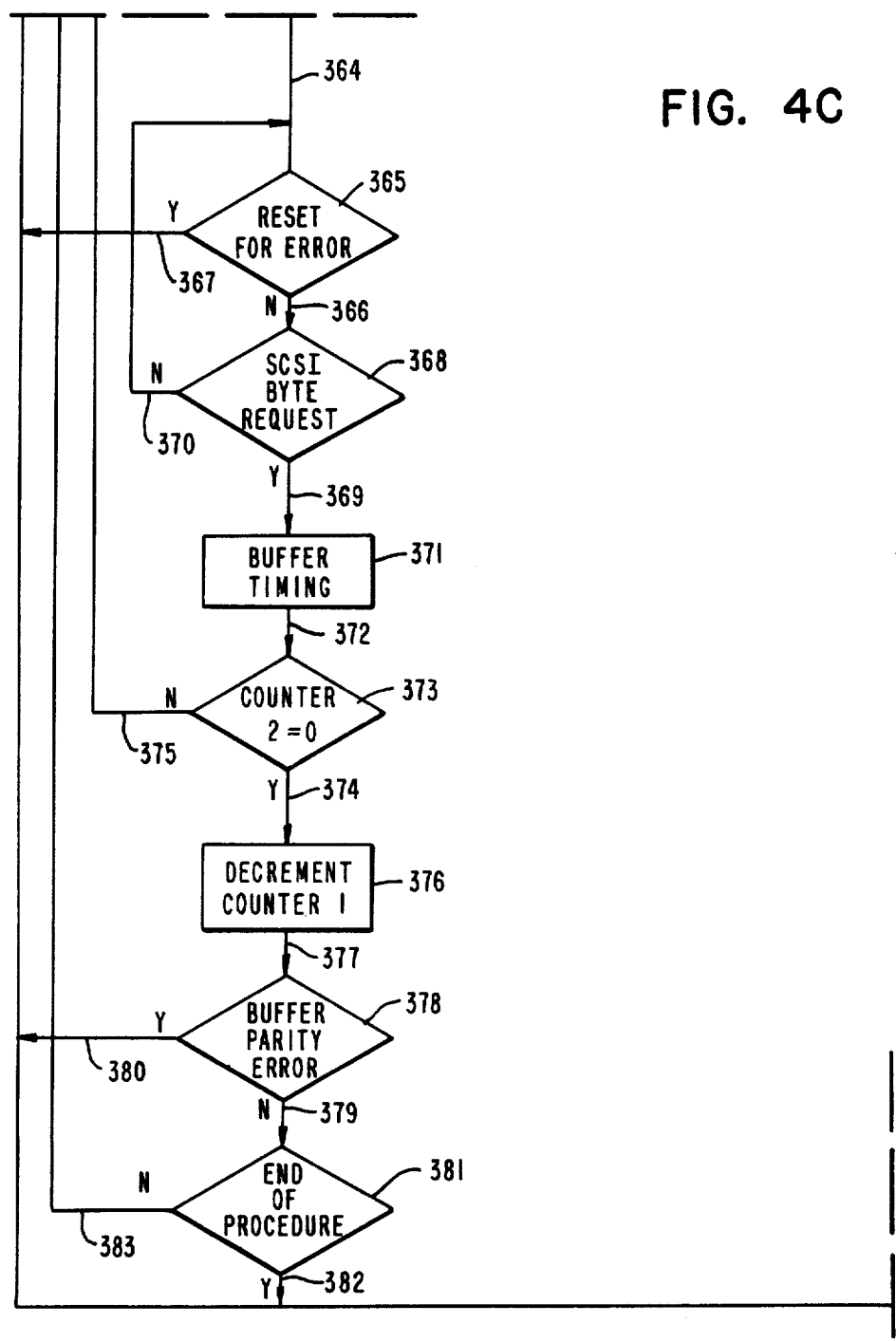

Inside of the Buffer Control 50 is a finite state machine (FSM) 100 (see FIG. 2), which controls the transfer of data between the SCSI Bus 22 and the Disk Data/Control circuit 37. Referring now to FIG. 2, the FSM 100 is shown in block diagram form. The FSM has nine inputs: SCSI Send, SCSI Receive, Transfer to/from Disk Terminated, Error Termination for SCSI Subsystem Error, Buffer Parity Error, SCSI Data Bus Parity Error, Disk Data In Buffer, Block Count Equals Zero, and SCSI Bus Request for Data. It also has seven outputs: Pause (Bus Buffer Inactive), Load Counters with the Number of Blocks and the Number of Bytes per Block, Reset Disk Data Available In Buffer Indicator and Rotate Buffers, Decrement the Block Count, Sequence Termination Signal, and Bus State Machine Active. Shown in FIG. 3 is a state diagram of the FSM 100. The state diagram shows that the FSM 100 has sixteen possible states that it can be in during a time segment, given the required sequence of inputs and outputs. A transition arrow shows the direction to the next state upon fulfillment of the condition specified by the arrow. Table I lists the sixteen possible states by four bit state numbers and names some of the states of the FSM 100. Table II lists the boolean equation of each condition for each transition in the direction of the respective transition arrow 200-256. While in any state, the FSM 100 will be supplied with transition conditions, e.g. input conditions, output conditions and internal conditions, which will uniquely define the next state. From the state diagram of FIG. 3 and the information in Tables I and II, one skilled in the art could build a circuit require to carry out the sequence of the FSM 100. The state diagram of the FSM 100 is exemplary only, since those skilled in the art will recognize that many variations of the state diagram shown are possible, such as the sequence of processing through the concatenated unconditional states, and thus the example shown is not intended to be limiting.

TABLE I

| STATE BINARY DESIGNATION | STATE |
| --- | --- |
| 0000 | PAUSE |
| 0001 | LOAD THE NUMBER OF BLOCKS AND BYTES INTO COUNTERS |
| 0010 | |
| 0011 | |
| 0100 | DECREMENT BLOCK COUNTER |
| 0101 | RESET DISK AVAILABLE IN BUFFER INDICATOR; ROTATE BUFFERS |
| 0110 | |
| 0111 | DECREMENT BYTE COUNTER |
| 1000 | |
| 1001 | |
| 1010 | |
| 1011 | |
| 1100 | |
| 1101 | |
| 1110 | |
| 1111 | SEQUENCE TERMINATION |

TABLE II

| TRANSITION | BOOLEAN CONDITION |
| --- | --- |
| 200 | (SCSISEND)' · (SCSIREC)' = 1 |
| 202 | SCSISEND = 1 |
| 204 | SCSIREC = 1 |
| 206 | DTC = 1 |
| 208 | (DTC)' = 1 |
| 210 | SCSISEND = 1 |
| 212 | (DTC)' · (TERM)' = 1 |
| 214 | SCSIREC = 1 |
| 216 | DTC · (TERM)' = 1 |
| 218 | TERM = 1 |
| 220 | UNCONDITIONAL |
| 222 | (SRD)' · (SEQRES)' = 1 |
| 224 | SCSIREC = 1 |
| 226 | UNCONDITIONAL |
| 228 | SRD · (SEQRES)' = 1 |
| 230 | SEQRES = 1 |
| 232 | (DTC)' = 1 |
| 234 | SREQLS = 1 |
| 236 | (SREQLS)' · (BYTECNT∅) = 1 |
| 238 | SCSISEND · (SBPER)' = 1 |
| 240 | (EOP)' = 1 |
| 242 | EOP = 1 |
| 244 | (SCSISEND · SBPER) + (SCSIREC · SDBPER) = 1 |
| 246 | (SCSIREC · (SDBPER)') = 1 |
| 248 | UNCONDITIONAL |
| 250 | (SREQLS)' · (BYTECNT∅)' = 1 |
| 252 | UNCONDITIONAL |
| 254 | UNCONDITIONAL |
| 256 | UNCONDITIONAL |

WHERE: BYTE CNT∅ represents the number of bytes remaining to be transferred within the present block; BYTE CNT∅=1 when there are zero BYTES remaining in the present block to be transferred. A prime (#) indicates a boolean complement operation of a term.

Referring now to FIGS. 4A through 4D, which is a logical flow diagram of the FSM 100 and to FIGS. 1A and 1B, a method and its implementation for controlling the transfer of data to/from the SCSI Bus 22 through two rotating buffers 34, 36 is shown. The method is initiated by the microprocessor 12 at 300 and after initialization is self-sequencing. The first action sets the PAUSE output of the FSM 100 to logic 1 to activate the testing for SCSI data transfer commands. The next action at 304 is to determine if a SCSI Receive command has been received. If a SCSI Receive command has been received then the method branches along path 305 to the SCSI Receive portion of the method which will be discussed below. If, however, a SCSI Receive command is not received, the method follows path 350 and determines if a SCSI Send command has been received at 351. If a SCSI Send has been received the method branches along path 352 to the SCSI Send portion of the method which will be discussed below. If, however, a SCSI Send command has not been received, the method closes back along path 353, 301 to the beginning action at 302.

When the determination at 304 is that a SCSI Receive command has been received, the program branches along path 305 to the action at 306 where the Pause output of the FSM 100 is reset to logic 0 to indicate activity. Next the method follows path 307 to the action at 308 for determining if disk data is available in the logically connected buffer 34 or 36 awaiting transfer to the SCSI Bus 22. If the determination at 308 is that the logically connected buffer 34 or 36 does not have disk data available for transfer then the method branches along path 310 to the action at 331 which will be discussed below. On the other hand, if the determination at 308 is that data transferred from the disk 20 is available in the logically connected buffer 34 or 36 then the method continues along path 309 to the action at 311. At 311 the number of blocks of data and the number of data bytes per block are loaded into respective counters of the buffer control 50. After the block count and the byte count are loaded into their respective counters the method continues along path 312 to the action at 313 which decrements by one the byte count in the byte counter. This is done in anticipation of the transfer of one byte from the buffer 34 or 36 to the Buffer Out Bus 32 and to the SCSI Bus 22. The method next follows path 314 to action 315 which determines if the SCSI Bus 22 currently has a sub-system error condition. If a SCSI sub-system error condition is determined to exist then the data transfer is aborted and the method branches along paths 317 and 337 to start the transfer anew. If there is no SCSI sub-system error then the method follows path 316 to the action at 318 where a determination is made if the SCSI Bus 22 is requesting to receive a byte of data from the logically connected buffer 34 or 36. If the SCSI Bus 22 is not requesting a byte of data then the method loops back along path 320 to the previously discussed action at 315. If, however, a byte of data is being requested by the SCSI Bus 22 at 318, then the method continues along path 319 to the action at 321 which coordinates the timing of the transfer of one byte of data from buffer 34 or 36 to the SCSI Bus 22. Next, the method continues along path 322 to the action at 323 where a determination is made if the last data byte of the present block has been transferred from the buffer 34 or 36. If the determination is that this is no the last byte of the block, the method loop back along path 325 to the action at 313 to begin anew the transfer sequence of a subsequent data byte in the manner described immediately above; however, if the byte of data just transferred was the last data byte in the block, then the method continues along path 324 to the action at 326. At 326, since the last byte of the data block was just transferred, the transfer of that data block is completed and therefore the block count in the block counter is decremented by one. Next the method continues along path 327 to the action at 328 where a determination is made if a parity error has occurred on the SCSI Bus 22 during the transfer of the data block and if a parity error did occur, then the method branches back along path 330,337 to the beginning at 302. However, if a parity error did not occur during the data block transfer, then the method continues along path 329 to the action at 331 where a determination is made if there is disk data to be transferred awaiting in the buffer 34 or 36 which is not presently logically connected to the Buffer Out Bus 32 and therefore to the SCSI Bus 22. If the determination is that no data is awaiting transfer, then the method branches along path 333 to a determination at 339 as to whether to terminate because the disk 20 has failed to supply data to the buffer 34 or 36 which has been logically connected to the Buffer In Bus 30, or to loop back to 331 along paths 338, 310 while the disk 20 completes a current data transfer to the buffer 34 or 36 which is logically connected to the Buffer In Bus 30. When, on the other hand, the determination is that data is awaiting to be transferred in the buffer 34 or 36 not connected to the SCSI Bus 22, then the method continues along path 332 to the action at 334 where the buffers are rotated, the disk data available in buffer indicator is reset to logic zero, and the SCSI data in buffer indicator is set to logic one. Next, the method goes to the action at 336 along path 335 and determine if the end of the procedure transferring data blocks to the SCSI Bus 22 from the disk 20 has been completed, and if it has not been completed, then the method branches back along paths 338, 309 to begin another block count and byte count load at 311, as described previously. If the determination at 336 is that the end of the data block transferring procedure has been reached, the method returns along paths 337,301 to the beginning at 302. This completes the SCSI Receive portion of the method.

The SCSI Send portion, as described previously, is entered along path 352, and the first action is the resetting of the Pause output of the FSM 100 (see FIG. 2) to logical zero at 354. Continuing along path 355 the number of data blocks and the number of bytes per data block are loaded into respective counters to coordinate the sending of data from the SCSI Bus 22. Next, the method follows path 357 to the action at 358 which is the determination if the logically connected buffer 34 or 36 has been filled by the SCSI Bus 22 through the Buffer In Bus 30 and has data awaiting transfer to the disk 20 through the Buffer Out Bus 32. If the determination at 358 is no, the method branches along path 360 to an action at 384 to determine if the logically connected buffer 34 or 36 does not have any data awaiting transfer because the present transfer is still in process or because the transfer process has been terminated. If the transfer process has been terminated, such as for a disk 20 failure, then the method aborts and loops back along paths 386,337 to the beginning at 302. If, however, the disk data in the logically connected buffer 34 or 36 has simply not completed the data transfer yet, then a termination has not been made and the method loops back along path 385 to the action at 358 until the buffer 34 or 36 has been filled. When the determination at 358 is that the buffer 34 o 36 has data available for transfer to the Buffer Out Bus 32, then the method continues along path 359 to an action at 361, where the buffers 34,36 are rotated, the disk data available in buffer indicator is reset to logic zero and the SCSI data in buffer indicator is set to logic one. Next, the method follows path 362 to an action 363 where the number of bytes in the byte counter is decremented by one. This is done in anticipation of the transfer of one byte from the SCSI Bus 22 into the presently logically connected buffer 34 or 36. From 363 the method continues along path 364 to an action at 365 which determines if a SCSI sub-system error has occurred. If a SCSI sub-system error has occurred, the method aborts back along paths 367, 337 to the beginning at 302. If, on the other hand, a SCSI sub-system error has not occurred, the method continues along path 366 to an action at 368 which determines if a SCSI Request to send a byte of data has been received. If the SCSI Request to send has not been received, the method loops back along path 370 to the action at 365 to determine again if a SCSI sub-system error has occurred. If, however, a SCSI Request to send has been received, the method continues along path 369 to an action at 371 which coordinates the writing of one byte of data from the SCSI Bus 22 through the Buffer In Bus 30 to the logically connected buffer 34 or 36. After the action at 371, the method continues along path 372 to an action at 373 which determines if the byte just written to the logically connected buffer 34 or 36 is the last byte of the current data block. If it is not the last byte of the block, the method loops back along path 375 to the action at 363, described previously, to transfer a subsequent byte of data of the block to the logically connected buffer 34 or 36. If the byte transferred was the last byte of the data block, the method continues along path 374 to an action at 376 which decrements by one the block count in the data block counter. Next, the method continues along path 377 to an action at 378 which determines if a buffer parity error has occurred during the block transfer. If a buffer parity error did occur, the method aborts back along paths 380, 337 to the beginning at 302; or if a buffer parity error did not occur, the method continues along path 379 to an action at 381. The action at 381 determines if the end of the SCSI Bus 22 to the logically connected buffer 34 or 36 transfer procedure has occurred, i.e. is this the last data block to be transferred to one of the rotating buffers? If the data block just completed is not the last block of the procedure, the method loops back along path 383 to the action at 356, described previously, to transfer a subsequent data byte. If, however, the data block just completed was the last block to be transferred during the current procedure, the SCSI Send portion of the method has been completed and the method returns along paths 382, 337 to the beginning action at 302. From 302 the method loops continuously until a SCSI Send or a SCSI Receive command is received by the FSM 100 (see FIGS. 2 and 3), and when one is received the respective portion of the method is executed.

Thus, it will now be understood that there has been disclosed a new and efficient method and apparatus for controlling the transfer of data to and from a SCSI bus using multiple buffers thereby providing a high data transfer rate at a very low cost.

As will be evident from the foregoing description, certain aspects of the invention are not limited to the particular details of the example illustrated, and it is therefore contemplated that other modifications or applications will occur to those skilled in the art, such as equivalent finite state machines, it is accordingly intended that the claims shall cover all such modifications and applications which do not depart from the true spirit and scope of the invention.

What is claimed and desired to be secured by Letters Patent of the United States is:

1. A method for controlling the transfer of data between a SCSI bus and a disk memory using a finite state machine and a plurality of data buffers comprising the steps of:
   a. initializing the finite state machine to a pause state indicating there is no data to be transferred;
   b. determining if an input command to send data to the SCSI bus has occurred and if it has not then returning to step a;
   c. resetting the finite state machine from the pause state indicating that the data transfer is occurring and starting the data transfer;
   d. determining if a disk-data-in-buffer input command has occurred and if it has not, then advancing to step n;
   e. transferring from the SCSI bus to a first counter the number of blocks of data to be transferred and transferring to a second counter the number of bytes in each block to be transferred to a first of the plurality of data buffers;
   f. decrementing the byte count in the second counter by one;
   g. determining if a subsystem error has occurred on the SCSI bus, and if the subsystem error has occurred, returning to step a;
   h. determining if a SCSI bus request has occurred, and if the SCSI bus request has not occurred returning to step g;
   i. writing a byte of data from the SCSI bus to the first data buffer;
   j. determining if the number of bytes remaining to be transferred in the block of data is equal to zero, and if the number of bytes in the block remaining to be transferred is not equal to zero returning to step f;
   k. decrementing the block count in the first counter;
   l. determining if disk data available for transfer awaits in the first data buffer and if not so advancing to step o;
   m. rotating to a second data buffer of the plurality of data buffers, indicating that the second data buffer does not have disk data available for transfer and that the first data buffer is available to receive disk data;
   n. determining if the end of the data transfer procedure has occurred and if so returning to step a, and if not so returning to step e; and
   o. determining if a terminate data transfer with disk memory input indication has occurred, and if not so returning to step a.

2. A method for controlling the transfer of data between a SCSI bus and a disk memory using a finite state machine and a plurality of data buffers comprising the steps of:
   a. initializing the finite state machine to a pause state indicating there is no data to be transferred;
   b. determining if an input command to send data to the SCSI bus has occurred and if it has not then advancing to step a;
   c. resetting the finite state machine from the pause state indicating that the data transfer is occurring and starting the data transfer;
   d. determining if a disk-data-in-buffer input command has occurred and if it has not, then advancing to step n;
   e. transferring from the SCSI bus to a first counter the number of blocks of data to be transferred and transferring to a second counter the number of bytes in each block to be transferred to a first of the plurality of data buffers;
   f. decrementing the byte count in the second counter by one;
   g. determining if a subsystem error has occurred on the SCSI bus, and if the subsystem error has occurred, returning to step a;
   h. determining if a SCSI bus request has occurred, and if the SCSI bus request has not occurred returning to step g;
   i. writing a byte of data from the SCSI bus to the first data buffer;
   j. determining if the number of bytes remaining to be transferred in the block of data is equal to zero, and if the number of bytes in the block remaining to be transferred is not equal to zero returning to step f;
   k. decrementing the block count in the first counter;
   l. determining if disk data available for transfer awaits in the first data buffer and if not so advancing to step o;
   m. rotating to a second data buffer of the plurality of data buffers, indicating that the second data buffer does not have disk data available for transfer and that the first data buffer is available to receive disk data;
   n. determining if the end of the data transfer procedure has occurred and if so returning to step a, and if not so returning to step e;
   o. determining if a terminate data transfer with disk memory input indication has occurred, and if not so returning to step a;
   p. determining if an input command to receive data has occurred, and if it has not then returning to step a;
   q. resetting the finite state machine from the pause state indicating the start of and starting the data transfer;
   r. transferring to the first counter the number of blocks to be transferred and to the second counter the number of bytes in each block of data to be transferred from one of the plurality of data buffers;
   s. determining if the data buffer referred to in step q has data available for transfer from the disk memory and if not so advancing to step bb;
   t. rotating to another of the plurality of data buffers, resetting the data available indicator on the data buffer the SCSI bus just rotated from and setting the buffer-available-for-data indicator on the data buffer the SCSI bus just rotated to;
   u. decrementing the byte count in the second counter by one;
   v. determining if a subsystem error has occurred in the data transfer and if so, returning to step a;
   w. determining if a request for the data available in the data buffer the SCSI bus rotated to in step t has been made by the disk memory and if not so, returning to step v;

x. reading to the SCSI bus a byte of data available in the data buffer the SCSI bus rotated to in step t;

y. determining if the SCSI byte count in the second counter is equal to zero;

z. decrementing the block count in the first counter;

aa. determining if the end of the data transfer procedure has occurred and if not so returning to step s, and if so returning to step a; and bb. determining if a terminate data transfer with disk memory has occurred and if not so returning to step u, and if so, returning to step a.

3. The method according to claim 1 further comprising:
after step k and before step l, the additional step of determining if a SCSI bus parity error has occurred and if so returning to step a.

4. The method according to claim 2 further comprising:
after step k and before step l, the additional step of determining if a SCSI bus parity error has occurred and if so returning to step a.

5. The method according to claim 2 further comprising:
after step z and before step aa, the additional step of determining if a buffer parity error occurred during the reading of the data from the data buffer referred to in step q to the SCSI bus.

6. The method according to claim 4 further comprising:
after step z and before step aa, the additional step of determining if a buffer parity error occurred during the reading of the data from the data buffer referred to in step q to the SCSI bus.

7. An apparatus for controlling the transfer of data between a SCSI bus and a disk memory using a plurality of data buffers comprising:
means for initializing the apparatus to a pause state indicating there is no data to be transferred;
means for determining if an input command to receive data from the SCSI bus has occurred;
means responsive to a determination that an input command to receive data from the SCSI bus has not occurred for determining if an input command to send data to the SCSI bus occurred;
means responsive to a determination that an input command to send data to the SCSI bus has occurred for resetting the apparatus from the pause state indicating that a send data transfer is in process;
means for starting the send data transfer;
means for determining if a disk-data-in-buffer input command has occurred;
means responsive to the disk-data-in-buffer input command determining means for transferring from the SCSI bus to a first counter the number of blocks of data to be transferred in the send data transfer;
means responsive to the disk-data-in-buffer input command determining means for transferring to a second counter the number of bytes in each block to be transferred in the send data transfer to a first of the plurality of data buffers;
means for decrementing the byte count in the second counter by one;
means responsive to the SCSI bus for determining if a SCSI bus request has occurred;
means responsive to the SCSI bus request determining means for writing a byte of data from the SCSI bus to the first data buffer;
means responsive to the means for writing a byte of data from the SCSI bus to the first data buffer, and the second counter for determining if the number of bytes remaining to be transferred in the block of data of the send transfer is equal to zero;
means responsive to the determination that the number of bytes remaining to be transferred in the block of data of the send data transfer is equal to zero for decrementing the block count in the first counter;
means for determining if disk data available for transfer awaits in the first buffer;
means responsive to a determination that there is no disk data available in the first buffer means for rotating to second data buffer of the plurality of data buffers, indicating that the second data buffer does not have disk data available for transfer and that the first data buffer is available to receive disk data;
means responsive to the first counter for determining if the end of the send data transfer procedure has occurred; and
means for determining if a terminate send data transfer with disk memory input indication has occurred.

8. The apparatus for controlling the transfer of data between a SCSI bus and a disk memory according to claim 7, further comprising:
means for resetting the apparatus from the pause state indicating the start of the receive data transfer;
means for starting the receive data transfer;
means for transferring to the first counter the number of blocks to be transferred and to the second counter the number of bytes in each block of data to be transferred in the receive transfer from one of the plurality of data buffers;
means for determining if the data buffer presently switched to the SCSI bus has data available for transfer from the disk memory;
means responsive to the determination that the data buffer presently switched to the SCSI bus does not have data available for transfer for rotating to another of the plurality of data buffers;
means responsive to the data buffer rotating means for resetting the data available indicator on the data buffer that the SCSI bus just rotated from;
means responsive to the determination that the data buffer recently switched to the SCSI bus does have data available for transfer for setting the buffer-available-for-data indicator on the data buffer the SCSI bus just rotated to;
means for decrementing the byte count of the receive transfer in the second counter by one;
means for determining if a request for data available in the buffer switched to the SCSI bus has been made by the disk memory;
means responsive to a determination that the request for data available in the buffer switched to the SCSI bus has been made by the disk memory for reading to the SCSI bus a byte of data available in the data buffer switched to the SCSI bus;
means for determining if the SCSI byte count of the receive transfer in the second counter is equal to zero;

means responsive to a determination that the SCSI byte count of the receive transfer in the second counter is equal to zero for decrementing the block count of the receive transfer in the first counter;

means connected to the first counter for determining if the end of the receive data transfer procedure has occurred;

means for determining if a terminate receive transfer with the disk memory condition has occurred; and means for cycling the apparatus to provide for the transfer of data.

* * * * *

UNITED STATES PATENT AND TRADEMARK OFFICE
CERTIFICATE OF CORRECTION

PATENT NO. : 4,843,544
DATED : June 27, 1989
INVENTOR(S) : Keith B. DuLac et al.

It is certified that error appears in the above-identified patent and that said Letters Patent is hereby corrected as shown below:

Column 14, line 18, after the word "to", insert --a--.

Column 14, line 52, delete "recently" and substitute --presently--

Signed and Sealed this

Twenty-seventh Day of February, 1990

Attest:

JEFFREY M. SAMUELS

Attesting Officer     Acting Commissioner of Patents and Trademarks